United States Patent
Johansson et al.

(10) Patent No.: US 6,971,303 B2
(45) Date of Patent: Dec. 6, 2005

(54) METHOD AND DEVICE AT A PISTON-CYLINDER DEVICE

(75) Inventors: Marten Johansson, Mjolby (SE); Per Nordvall, Tranas (SE); Krister Gustafsson, Tranas (SE)

(73) Assignee: Stromsholmen AB, Tranas (SE)

( * ) Notice: Subject to any disclaimer, the term of this patent is extended or adjusted under 35 U.S.C. 154(b) by 36 days.

(21) Appl. No.: 10/250,808

(22) PCT Filed: Nov. 5, 2002

(86) PCT No.: PCT/SE02/02002

§ 371 (c)(1), (2), (4) Date: Dec. 29, 2003

(87) PCT Pub. No.: WO03/054415

PCT Pub. Date: Jul. 3, 2003

(65) Prior Publication Data

US 2004/0089148 A1 May 13, 2004

(30) Foreign Application Priority Data

Nov. 12, 2001 (SE) .................................. 0103756

(51) Int. Cl.[7] .................................................. F16F 9/02
(52) U.S. Cl. .................. 92/169.1; 267/119; 188/322.18
(58) Field of Search ................................. 92/169.1, 182; 60/478; 267/118, 119, 120, 130; 188/322.18

(56) References Cited

U.S. PATENT DOCUMENTS

| | | | |
|---|---|---|---|
| 3,995,842 A | 12/1976 | Freitag | |
| 5,064,030 A | 11/1991 | Wossner | |
| 5,620,067 A * | 4/1997 | Bauer et al. | ............ 188/322.19 |
| 6,322,059 B1 * | 11/2001 | Kelm et al. | .................. 267/119 |

FOREIGN PATENT DOCUMENTS

EP 0 427 468 A1 5/1991

* cited by examiner

Primary Examiner—Thomas E. Lazo
(74) Attorney, Agent, or Firm—Merchant & Gould P.C.

(57) ABSTRACT

A method and an arrangement in an energy-accumulating piston-cylinder arrangement (A) has a piston/piston rod part (2), guide/end (3) and tubular casing (1). The casing (1) is provided with a fracture or sprain mark (7) in order to initiate a controlled deformation of the casing in the event of a load that produces a stress in excess of a sprain or fracture limit, or of repeated cyclical stressing that gives rise to material fatigue, so that an excess pressure in the arrangement (A) is discharged past the deformed casing.

8 Claims, 3 Drawing Sheets

METHOD AND DEVICE AT A PISTON-CYLINDER DEVICE

Figure 1:
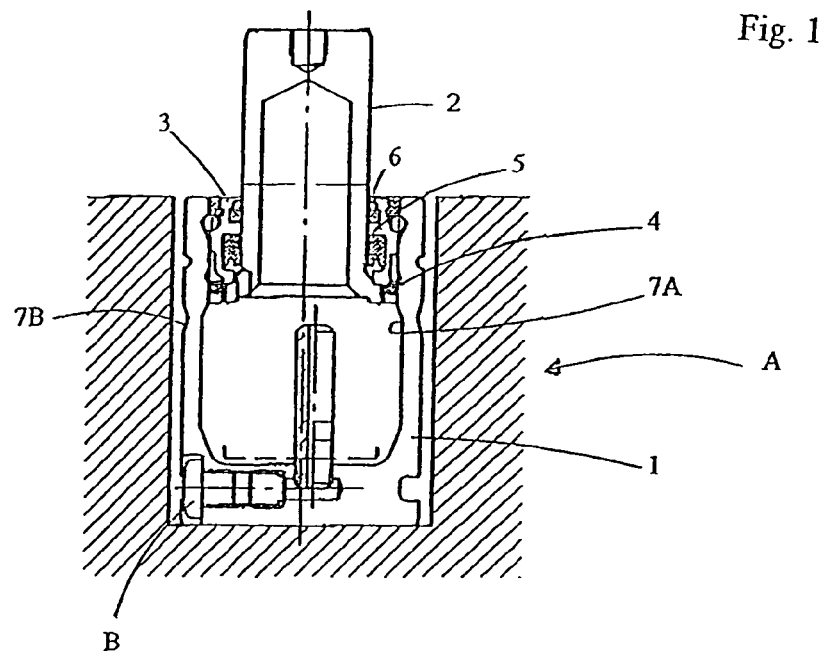

The present invention relates to a method and an arrangement in a piston-cylinder arrangement, more specifically a method and an arrangement which in the event of a malfunction or deformation of the said piston-cylinder arrangement permits controlled discharge of the pressure therein.

As an example of the prior art, reference will be made to U.S. Pat. No. 3,995,842 A, which discloses a pneumatic spring of piston-cylinder type. This spring is of the type used in order to relieve the pressure on the bonnet or boot of a motor vehicle and has been provided with breakable sections in the cylinder wall and on the piston rod in the form of a reduced cross-section. These sections give way under increased pressure caused by fire or collision, thereby releasing compressed gas from the cylinder into the surrounding air through an opening in the cylinder wall or the piston rod under conditions that cannot eject the pieces of the cylinder at high speed.

The object of the invention is to provide a method and an arrangement in a piston-cylinder arrangement which can more safely cope with damage to a tubular casing due to overload, flash-over and/or fatigue and permit a controlled discharge of the pressure in the arrangement.

The stated object of the invention is achieved in that the arrangement has the characteristics specified in the patent claims.

The invention will be described in connection with gas accumulators and with use of gas-filled springs in a sheet metal press, in which the function of the gas-filled springs is, among other things, to hold the sheet metal during the forming processing and to separate the tool halves when sheet metal forming has been carried out. Gas-filled springs are therefore used to support the sheet metal holder and they are subjected to pressure at the beginning of the pressing process, to be relieved of pressure again on the completion of sheet metal forming when the press slide and the press upper part move upwards. To what extent the gas-filled springs are subjected to loading is determined by the pressing process, by the appearance of the pressed sheet metal part and by the stroke length used. Even if the characteristic of the gas-filled springs is selected according to the appearance and shape of the pressed sheet metal part, with the aim of achieving full control of the press cycle, there is a risk that the press cycle cannot always be safely controlled. The gas-filled springs are damaged by covering an excessively long stroke, that is to say a stroke that exceeds their defined nominal stroke length. Such overloading risks permanently damaging the piston/piston rod/guide and tubular casing of the gas-filled spring. Depending on the degree of overload there is always a risk in the longer term of a reduced service life of the gas-filled spring. There is also an obvious risk of the tubular casing of the gas-filled spring being damaged in such a way that an uncontrollable leakage occurs. Repeated stressing can also give rise to a fatigue fracture in the cylindrical or casing part of the gas-filled spring.

Figure 2A:
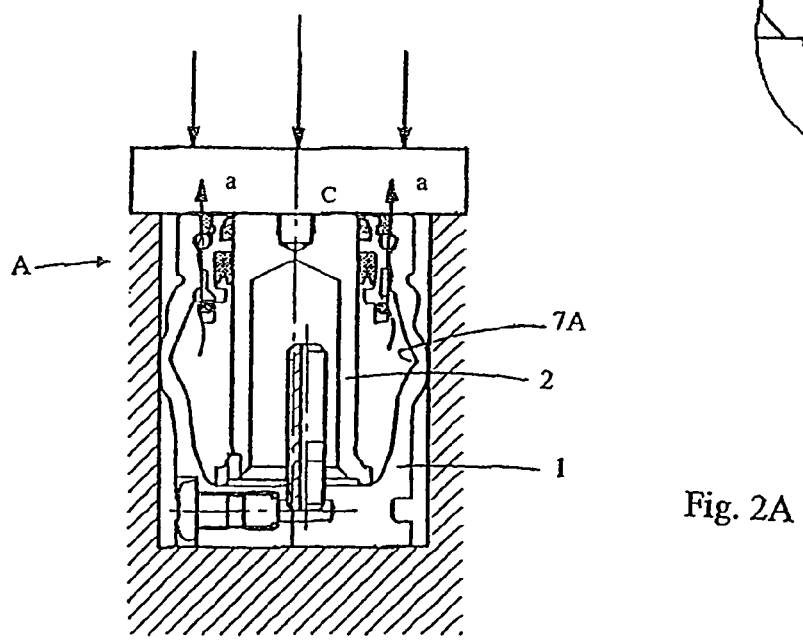
Figure 2B:
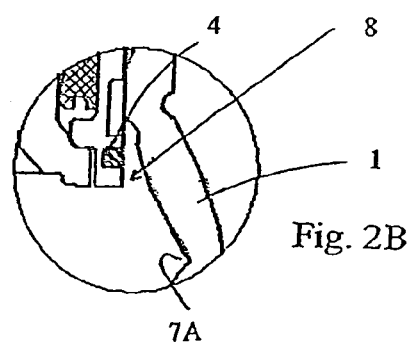
Figure 3A:
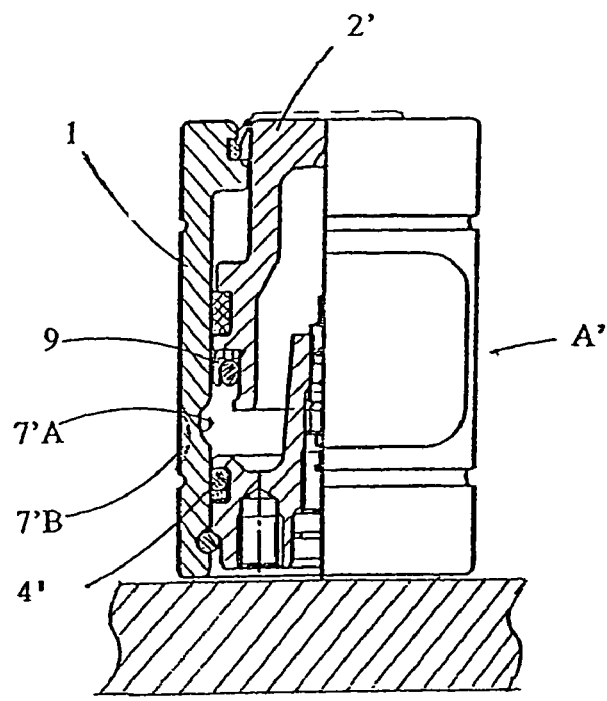
Figure 3B:
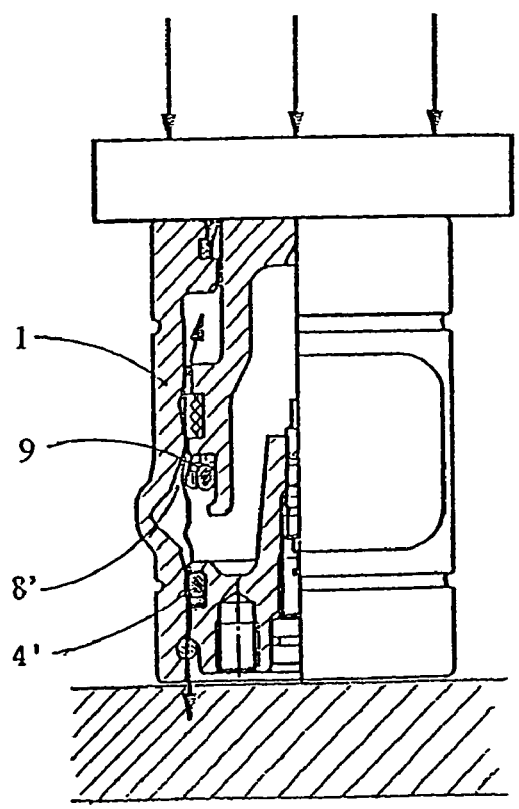
Figure 4A:
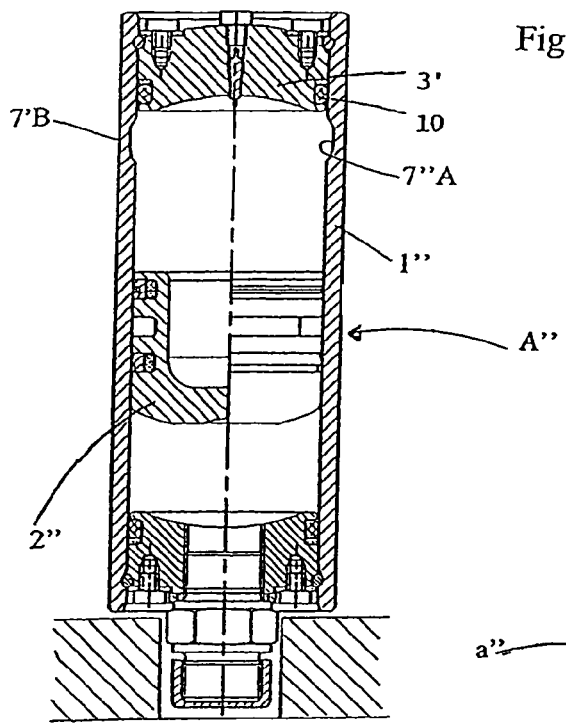
Figure 4B:
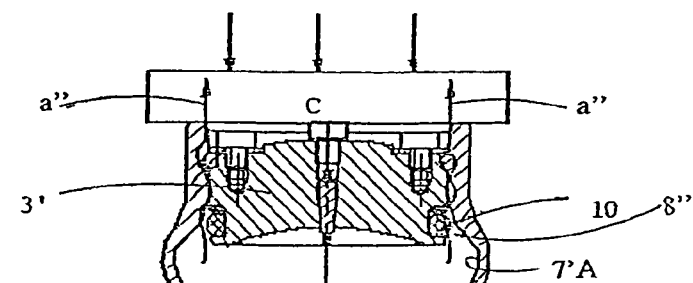
Figure 4B:
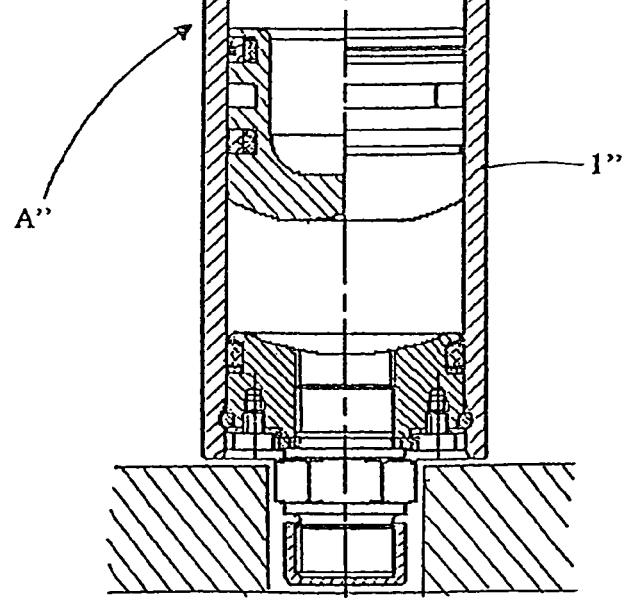

The invention will now be described in more detail with reference to examples of embodiments shown in the drawings attached, in which:

FIG. 1 is a section through a gas-filled spring arrangement in a position with piston projecting, with markings for weakened areas in the tubular casing of the gas-filled spring arrangement, FIGS. 2A and 2B are a corresponding section through the gas-filled spring arrangement according to FIG. 1 in an "overloaded" position with the tubular casing deformed, FIGS. 3A and 3B are sections through a gas-filled spring with markings for weakened areas on the outside and/or inside of the tubular casing of the gas-filled spring in a normal working position, and in an overload position respectively, and FIGS. 4A and 4B are sections through a gas accumulator with markings for weakened areas on the outside and/or inside of the tubular casing of the gas accumulator in a normal working position, and in an overload position permitting discharge of the excess pressure in the gas accumulator.

FIG. 1 shows the gas-filled spring arrangement A retracted in a recess, for example a base, the arrangement comprising a cylindrical sleeve or tubular casing 1, a piston/piston rod part 2, a guide/end 3 and a filling connection B in the tubular casing 1. It must be pointed out in this context that the arrangement A may also be "non-retracted" in relation to a machine or machine part. Sealing arrangements 4, 5 and 6 between tubular casing 1 and piston/piston rod part 2 and guide/end 3 ensure a normally leak-free use of the arrangement A. FIG. 1A shows the piston/piston rod part 2 in an projecting position with fracture or deformation marks or grooves 7A, 7B in the tubular casing of the arrangement. These marks or grooves may be placed on the inside and/or outside of the tubular casing 1 and result in a weakening of the wall of the tubular casing, which means that in the event of a permitted stress being exceeded the material in the wall can give way and move outwards, thereby negating the action of the seal through the gap 8 that occurs and thus permitting discharge of the excess pressure inside the chamber of the tubular casing 1. The location, appearance and degree of such bulging can be predetermined by selecting the location and size of the grooves and/or the marks. Thus the weakening of the tubular casing and the choice of material therein can be made in such way that a fracture or cracking occurs in the tubular casing. According to a preferred embodiment of the invention material and weakening are selected in such a way that the deformation of the tubular casing does not result in the material fracturing, but to the occurrence of bulging in direct proximity to the said sealing arrangement 4 between piston/piston rod part 2, guide/end 3 and tubular casing 1, the reduced contact pressure between seal and tubular casing permitting a controlled discharge of the gas to occur past the seal 4. The weakening of the tubular casing that occurred is situated in close proximity to the lower end of a guide/seal 4. This is done in order to ensure that the bulging of the tubular casing occurs on the intended side of the guide/seal 4.

In order to further ensure discharge of the gas, a small axial groove can be provided in the guide, into which groove the gas can escape. This is done in order to ensure that any spraining of the tubular casing against the piston/piston rod, guide/end, that is to say metal against metal, will not block the desired discharge.

FIG. 2A shows a corresponding section through the gas-filled spring arrangement according to FIG. 1 in an "overloaded" position with the tubular casing 1 deformed, the discharge of the gas being shown by the arrows a. When the load has been removed, therefore, there will be no significant excess pressure in the chamber, for which reason any force that may act outwards on the piston 2 will be very slight. FIG. 2B shows an enlargement of the gap 8 that is formed between the wall of the tubular casing and the seal 4.

FIG. 3A shows a section through a gas-filled spring with markings for weakened areas on the outside and/or inside of the tubular casing 1 of the gas-filled spring. With this embodiment the spraining sustained by the casing wall can permit discharge of the excess pressure in the gas-filled spring in one or two directions. FIG. 3B, like FIG. 2A, shows how the discharge of the gas can occur past the deformed wall of the tubular casing 1 and past the seal 9. The deformation of the casing 1 also permits discharge past the seal 4', that is to say in two directions simultaneously.

FIGS. 4A and 4B show the invention applied in a gas accumulator A" with end 3' and seal 10 against the casing 1". A weakening mark 7"A, 7"B in the tubular casing 1" of the gas accumulator A" gives rise to the formation of a bulge or gap 8" in the event of a stress occurring that deforms the tubular casing 1". The arrows a" represent the desired and controlled discharge of the excess pressure in the gas accumulator.A".

The invention is not limited to the examples of embodiments described above but lends itself to modifications within the scope of the patent claims specified below.

What is claimed is:

1. An energy-accumulating piston-cylinder arrangement comprising: a piston/piston rod part: a guide/end having a seal; and a tubular casing indicating an inner wall and a fracture or sprain mark for initiating a controlled deformation of the casing, wherein in the event of a load that produces a stress in excess of a yield strength, or of repeated cyclical stressing that gives rise to material fatigue, the tubular casing is deformed by bending outwards, which reduces contact pressure or eliminates bearing contact between the seal in the guide/end and the inner wall surface of the tubular casing, thereby discharging an excess pressure from the casing thus deformed.

2. The energy-accumulating piston-cylinder arrangement according to claim 1, wherein the sprain mark is located on the inside of the casing.

3. The energy-accumulating piston-cylinder arrangement according to claim 1, wherein the fracture or sprain mark in the casing is situated in close proximity to the seal.

4. The energy-accumulating piston-cylinder arrangement according to claim 1, wherein the fracture or sprain mark in the casing is situated substantially centrally on the casing, the deformation sustained permitting a discharge between the seal and the inner wall of the tubular casing.

5. An energy-accumulating piston-cylinder arrangement comuprising:
    a piston/piston rod;
    a guide/end;
    a cylindrical tubular casing including an inner wall;
    a seal positioned to seal between the tubular casing and one of the piston/piston rod and the guide/end; and
    a fracture or sprain mark located on the tubular casing in close proximity to the seal, the fracture or sprain mark permitting the tubular casing to deform by bending outward, in the event of a load that produces a stress in excess of a yield strength, or of repeated cyclical stressing that gives rise to material fatigue,
    wherein the deformation of the tubular casing reduces contact pressure or eliminates bearing contact between the seal and the inner wall of the tubular casing, thereby discharging an excess pressure in the arrangement from the deformed casing.

6. The arrangement according to claim 5, wherein the mark is located on the inside of the tubular casing.

7. The arrangement according to claim 5, wherein an axial groove is arranged in proximity to the seal.

8. The arrangement according to claim 5, wherein the mark is located on the outside of the tubular casing.

* * * * *